Figure 1:
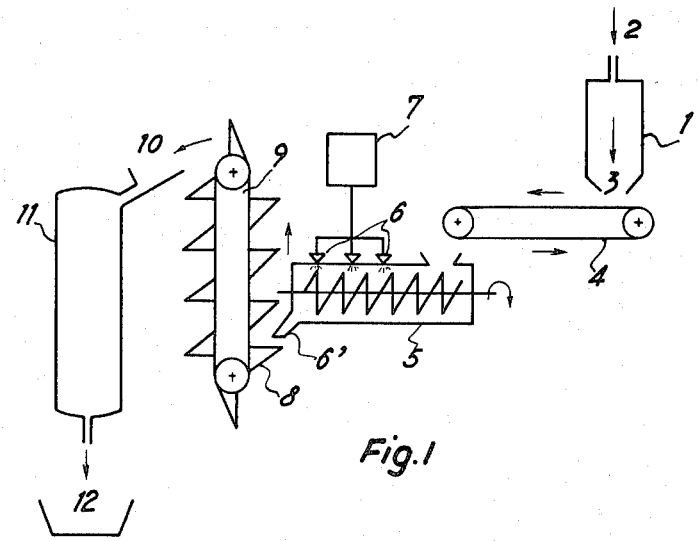

3,242,056
THERMALLY STABLE LYSOZYME COMPOSITION AND PROCESS FOR PREPARING SAME
Raoul Dubois-Prevost, Paris, France, assignor to Societe Lysofrance, Gennevilliers, France
Filed June 4, 1963, Ser. No. 285,383
Claims priority, application France, June 8, 1962, 7,428, Patent 1,325,322; May 11, 1963, 7,754
8 Claims. (Cl. 195—63)

Lysozyme is unstable and deteriorates in the presence of water, and the more dilute the solutions, the faster it deteriorates. Furthermore, lysozyme also becomes unstable at a high temperature, and this instability varies depending upon the moisture state of the lysozyme. When dry, lysozyme resists decomposition up to 120° C., whereas in water solution, it remains stable up to 65 to 70° C., deteriorates slowly up to 80° C., and then abruptly deteriorates up to 100° C.

The invention consists in a process for the preparation of a concentrated composition of thermally stable lysozyme, comprising extracting lysozyme from a natural material containing lysozyme, in the form of an aqueous solution, and introducing into the said aqueous solution of lysozyme a stabilising agent selected from the group consisting of diols and polyols.

The invention also consists in apparatus for carrying out the above process, comprising a clarifying tower, a mixer, a drying tower, transport means between these elements, and an atomisation system for atomising lysozymed sugar syrup, operating at a point between the outlet of the clarifying tower and the inlet of the drying tower.

The invention also consists in a composition comprising an aqueous solution of lysozyme stabilised by the addition of a compound selected from the group consisting of diols and polyols.

It has been found that sugar solutions of lysozyme are more stable than simple aqueous solutions, i.e. that the addition of sugar to an aqueous solution of lysozyme stabilises the lysozyme.

It is necessary to take economic considerations into account when selecting the source of lysozyme used in the process. Lysozyme is present in a number of natural substances, both animal and vegetable, and chiefly in egg white, which is its industrial source. A theoretically possible means of introducing lysozyme into sugar would therefore consist of introducing lysozyme in the form of egg white either in its natural state or in a congealed or dehydrated form. However, such a process is not to be recommended, because it introduces traces of albumen into the sugar which, since albumen coagulates under the action of heat, would make the sugar unsaleable. Pure crystallised lysozyme would be preferable, but would be far too expensive.

It has been found preferable to use the process of chemical extraction of lysozyme from its animal medium, the said process leading to the obtaining of lysozyme in the form of a salt such as the hydrochloride.

It has been found preferable to make direct use of the solution of lysozyme salt thus obtained, instead of lyophilising this solution, taking advantage of the aforementioned property of sugar, i.e. that it has a stabilising action on aqueous solutions of lysozyme.

One method of operation comprises the preparation of an aqueous solution of lysozyme by extraction from a natural substance, viz. egg white, and of the stabilisation of the said solution with a view to associating it with sugar by adding a quantity of sugar to the said solution, with a concentration up to that of Codex Pharmaceutique syrup, i.e. about 65%.

In an alternative method, the water of this syrup may be evaporated by inexpensive processes, to yield a sugar powder which keeps very well.

In both cases, the basic material, viz. the lysozyme in the form of a syrup or a sugar powder, is concentrated and stable.

This basic material is associated with the sugar at a particular stage of the manufacturing process by means which are carefully selected taking into account the following conditions: in the first place, the concentration of lysozyme in the sugar is from 10 to 100 parts per million at the most, i.e. very low, which makes its homogeneous distribution difficult. This is why it is out of the question to introduce it directly into crystallised sugar; also, it is known that the preparation of aqueous solutions is also ruled out by reason of the instability of such solutions. This is why the starting point in this product prepared as above, which is diluted in suitable proportions, taking into account, of course, the degree of moisture-content of the sugar itself at the moment of introduction.

Secondly, the means used to introduce this syrup brings about the atomisation of the sugar solution of lysozyme into very finely divided particles, under low pressure. This atomisation is effected as the sugar itself moves around so that the very fine atomised particles allow for a homogeneous distribution of the lysozyme, which attaches itself by absorption on each grain of sugar in the form of a fine particle of syrup, which itself becomes lysozymed sugar by evaporation of the water at the drying stage, without the heat having been able to destroy the enzyme since the evaporation of the water of the syrup absorbs the heat which might otherwise have deteriorated the lysozyme.

The time selected for the atomisation is after the sugar leaves the clarifying stage and before it enters the drying stage, so as to allow for the risk of losses of solution. The atomisation of lysozyme solutions under these conditions only increases the moisture content of the sugar by 2%, which gives rise to no significant overloading of the drying apparatus.

In some cases, the presence of the sugar imparts to the lysozyme solution a taste which is sometimes barely compatible or even quite incompatible with the use intended for it, such as its incorporation in a dentifrice, or may make the manufacture of emulsions difficult, or prejudice the solubility of active principles, such as in the preparation of ointments and solutions, for example.

It has also been found that the stabilising properties of sugar are also manifested by other polyols and diols at degrees which may vary but are always considerable.

By "diols" is herein meant aliphatic dihydroxylated compounds, such as ethylene glycol, propylene glycol and glycerol. By "polyols" is herein meant aliphatic polyhydroxylated compounds such as pentaerythritol, sorbitol, mannitol, and cyclic compounds such as inositol and quercitol.

Lysozyme stabilised by the presence of a diol or a polyol can be used in preparations such as ointments, or solutions, such preparations also benefiting, if desired, from the sweetening and emollient properties of the stabilising agent added to the lysozyme solution used in these preparations.

In order to demonstrate the effectiveness of the classes of compounds used in the invention in the stabilisation of lysozyme solutions, a comparison has been drawn up between the stability, at different temperatures and over different periods of time, of a specimen aqueous solution containing 100 μg./ml. of lysozyme and of identical solutions also containing 35% (p./v.) of each of the agents investigated. The test technique is that described by Smolelis & Hartsell (J. Bact. 1949, 58, 731) and consists of the evaluation of the lysis of a freshly centrifuged and washed culture of *Micrococcus lysodeikticus*, with a pH of 6.2 and at room temperature, after the addition of the various lysozymed solutions. The conditions under which the preliminary treatment of these solutions is carried out so as to determine the stability of the lysozyme are as follows:

| Temperature ° C. | Time period |
|---|---|
| 45 | days 8 |
| 60 | hours 3 |
| 80 | do 2 |
| 100 | do 1 |

The calculation to make the comparison between the different degrees of activity is made in accordance with the formula:

$$A_r = T_e / T_x$$

in which:

$A_r$ = relative activity.

$T_e$ = time in seconds required by the specimen solution to lower the optical density of the substratum by about 400/1000.

$T_x$ = time taken by the solution tested to obtain the same result.

It will be seen that there is a protective action when $A_r$ is greater than 1 and that this action will be more efficient as $A_r$ increases.

The results obtained were as follows:

| Products Tested | Values of $A_r$ at Temperatures of— | | | |
|---|---|---|---|---|
| | 45° C. | 60° C. | 80° C. | 100° C. |
| Ethylene glycol | 1.88 | 1.41 | 1.76 | 4.3 |
| Propylene glycol | 2.1 | 1.46 | 2.22 | 4.3 |
| Glycerol | 1.46 | 1.82 | 1.15 | 2.22 |
| Sorbitol | 1.37 | 1.11 | 1.54 | 2.67 |
| Pentaerythritol | 1.41 | 0.37 | 0.48 | 0.66 |
| Mannitol | 1.75 | 1.00 | 1.00 | 1.00 |

It clearly emerges from these results that the addition of a diol or polyol to lysozyme solutions has a spectacular stabilising effect on the latter, particularly at higher temperatures at which, as previously stated, such solutions have a strong tendency to deteriorate.

The proportion of the stabilising agent for which the above results were obtained is 35%. However, this proportion may be lower or higher, depending both upon the nature of the protection agents selected and upon the temperature and/or the conservation period of the solution of lysozyme to be protected. The number of variables to be taken into account in this evaluation of the concentration for any particular case is such that it is not possible to give a precise rule for the choice of the proportion to be used. Very broadly speaking, however, proportions of from 10 to 75%, and preferably of from 20 to 40%, of the stabilising agents may be used. In fact stabilisation is achieved for substantially all concentrations, but the degree of this stabilisation may vary as a function of the concentration of stabilising agent.

Figure 2:
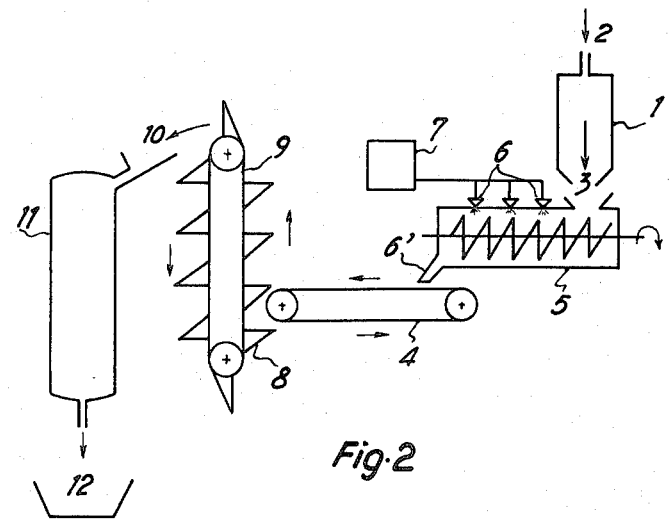

In order that the invention may be more clearly understood, two embodiments of apparatus in accordance therewith will now be described with reference to the accompanying drawings, in which:

FIGURE 1 illustrates an apparatus in which the syrup of lysozymed sugar is introduced into sugar at the moment it is mixed, just before being transported to a drying tower; and FIGURE 2 illustrates an alternative apparatus in which the introduction during the mixing is effected as soon as the sugar leaves the clarifying stage.

The same reference numerals designate the same elements in both figures, and referring to both figures, the sugar is fed at 2 into a sugar clarifying turbine 1 and evacuated from it at 3. It then falls on to a conveyor belt 4 in the apparatus shown in FIGURE 1, subsequently passing into an endless worm mixer 5, or falls directly into an endless worm mixer 5 in the apparatus shown in FIGURE 2. In the mixer 5, atomiser nozzles 6 project, under pressure, a solution of lysozymed sugar syrup coming from a reservoir 7. This mixer has a constant delivery and operates in a closed enclosure, so that there is no loss of lysozymed solution during the operation. At the output 6' from the mixer in FIGURE 1, or at the end of the conveyor belt 4 in FIGURE 2, the moist lysozymed sugar falls into scoops 8 arranged on a chain 9 supplying the sugar to the upper end 10 of a conventional drying tower 11. The lysozymed sugar, which is now ready to be packed for distribution, is obtained at the outlet 12 of the tower 11.

The above description is not intended to limit the invention, and any other arrangements for atomising the lysozymed sugar syrup on to the sugar at a point between the sugar clarifying and drying stages may be used.

The embodiments of the invention in which an exclusive property or privilege is claimed are defined as follows:

1. A process for the preparation of a concentrated composition of thermally stable lysozyme, consisting essentially of extracting lysozyme from a natural material containing lysozyme, in the form of an aqueous solution, and introducing into the said aqueous solution of lysozyme a stabilizing amount of an aliphatic polyol stabilizing agent.

2. A process for the preparation of a concentrated composition of thermally stable lysozyme, consisting essentially of extracting lysozyme from a natural material containing lysozyme by means of an aqueous acid, and introducing into the aqueous solution of lysozyme acid salt thus obtained a stabilising amount of an aliphatic polyol stabilising agent.

3. A process according to claim 2, wherein said stabilising agent is introduced in the proportion of from 10 to 70% by volume.

4. A process according to claim 2, wherein the stabilising agent is sugar.

5. A process for the preparation of a concentrated composition of thermally stable lysozyme, comprising extracting a natural material containing lysozyme by means of an acid, and introducing a stabilising amount of sugar into the aqueous solution of lysozyme acid salt thus obtained.

6. A process according to claim 5, comprising the additional step of evaporating the lysozyme acid salt solution containing sugar and obtaining a stable lysozyme sugar powder.

7. A process according to claim 5, wherein the sugar is introduced in a proportion of 65%.

8. A stable aqueous lysozyme solution in which is incorporated about 65% of sugar as stabilizer.

(References on following page)

References Cited by the Examiner

UNITED STATES PATENTS

| | | | |
|---|---|---|---|
| 703,439 | 7/1902 | Morrell | 127—9 |
| 2,672,428 | 3/1954 | Sklar | 127—46 |
| 2,689,203 | 9/1954 | Lolli | 195—63 |
| 2,991,229 | 7/1961 | Ivison | 167—93 |
| 3,050,445 | 8/1962 | Damaskus | 195—63 |
| 3,061,477 | 10/1962 | Lavallee | 127—9 |
| 3,108,907 | 10/1963 | Capdevila | 127—46 |
| 3,133,001 | 5/1964 | Muset | 195—68 |

FOREIGN PATENTS

| | | |
|---|---|---|
| 1,272,272 | 8/1961 | France. |

A. LOUIS MONACELL, *Primary Examiner.*

L. M. SHAPIRO, *Assistant Examiner.*